US008558824B2

(12) United States Patent
Kim et al.

(10) Patent No.: US 8,558,824 B2
(45) Date of Patent: Oct. 15, 2013

(54) BUFFER AMPLIFIER INCLUDED IN DISPLAY DRIVER AND METHOD OF GENERATING DRIVING VOLTAGES USING THE SAME

(75) Inventors: Hyung-tae Kim, Hwaseong-si (KR); Soo-ik Cha, Hwaseong-si (KR); Chon-wook Park, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1383 days.

(21) Appl. No.: 12/243,007

(22) Filed: Oct. 1, 2008

(65) Prior Publication Data

US 2009/0109198 A1 Apr. 30, 2009

(30) Foreign Application Priority Data

Oct. 25, 2007 (KR) ........................ 10-2007-0107818

(51) Int. Cl.
*G06F 3/038* (2013.01)
*G09G 5/00* (2006.01)

(52) U.S. Cl.
USPC .............. 345/211; 345/204; 345/212; 345/55

(58) Field of Classification Search
USPC ........................ 345/55, 204, 211–213; 326/62
See application file for complete search history.

(56) References Cited

U.S. PATENT DOCUMENTS

| | | | | |
|---|---|---|---|---|
| 2003/0146923 | A1 * | 8/2003 | Nakahira et al. | 345/690 |
| 2006/0017680 | A1 * | 1/2006 | Chen et al. | 345/96 |
| 2006/0290619 | A1 * | 12/2006 | Lee et al. | 345/77 |

FOREIGN PATENT DOCUMENTS

| | | |
|---|---|---|
| JP | 2001343948 | 12/2001 |
| JP | 2005316188 | 11/2005 |
| KR | 20030014750 | 2/2003 |

* cited by examiner

*Primary Examiner* — Jonathan Horner
(74) *Attorney, Agent, or Firm* — Stanzione & Kim, LLP

(57) ABSTRACT

A method of generating a driving voltage includes inputting a test gradation voltage to a first input terminal and a second input terminal of a buffer, latching the logic level of a test driving voltage output from an output terminal of the buffer, setting the buffer to a first type when the logic level of the test driving voltage is high level and setting the buffer to a second type when the logic level of the test driving voltage is low level, and operating the buffer set to the first type or the second type to generate a driving voltage corresponding to a gradation voltage.

21 Claims, 18 Drawing Sheets

BUFFER AMPLIFIER INCLUDED IN DISPLAY DRIVER AND METHOD OF GENERATING DRIVING VOLTAGES USING THE SAME

CROSS-REFERENCE TO RELATED APPLICATIONS

This application claims priority under 35 U.S.C. §119(a) from Korean Patent Application No. 10-2007-0107818, filed on Oct. 25, 2007, in the Korean Intellectual Property Office, the disclosure of which is incorporated herein in its entirety by reference.

BACKGROUND OF THE INVENTION

1. Field of the Invention

The present general inventive concept relates to a buffer amplifier and a method of generating driving voltages using the same and, more particularly, to a buffer amplifier included in a display driver and a method of generating a driving voltage using the same.

2. Description of the Related Art

As a gradation representation performance of a display system is improved, a display driver of the display system must apply a precise driving voltage to a display panel. That is, the display driver must generate a more accurate driving voltage as a number of gray scales increases.

FIG. 1 illustrates a conventional display device. Referring to FIG. 1, the display device includes a display panel 100, a source driver 110 and a gate driver 120. The display panel 100 includes a plurality of gate lines GL1, GL2, . . . and a plurality of source lines S_1, S_2, S_3, . . . . The gate lines GL1, GL2, . . . are driven by the gate driver 120 and the source lines S_1, S_2, S_3, . . . are driven by the source driver 110. The source driver 110 includes a plurality of decoders DEC1, DEC2, DEC3, . . . and a plurality of buffers BUF1, BUF2, BUF3, . . . .

The decoders DEC1, DEC2, DEC3, . . . respectively convert display data signals D1, D2, D3, . . . into gradation voltages V1, V2, V3, . . . . The buffers BUF1, BUF2, BUF3, . . . respectively buffer the gradation voltages V1, V2, V3, . . . to generate driving voltages Vo1, Vo2, Vo3, . . . . The driving voltages Vo1, Vo2, Vo3, . . . are respectively applied to the source lines S_l, S_2, S_3, . . . .

For example, the display data D1 is converted into the gradation voltage V1 by the decoder DEC1, the gradation voltage V1 is buffered by the buffer BUF1, and the driving voltage Vo1 generated according to a buffering operation of the buffer BUF1 is applied to the source line S_1. The buffer BUF1 has a respective offset characteristic thereof, and thus a deviation exists between an output voltage (that is, the driving voltage Vo1) and an input voltage (that is, the gradation voltage V1) of the buffer BUF1. That is, the output voltage (that is, the driving voltage Vo1) of the buffer BUF1 includes a positive deviation or a negative deviation. Furthermore, the buffers BUF2 and BUF3 have respective offset characteristics thereof and the driving voltages Vo2 and Vo3 generated by the buffers BUF2 and BUF3 include a positive deviation or a negative deviation.

Moreover, the buffers BUF1, BUF2, BUF3, . . . have different offset characteristics, and thus the buffers BUF1, BUF2, BUF3, . . . have different deviation polarities and deviation sizes. Accordingly, the driving voltages Vo1, Vo2, Vo3, . . . respectively generated by the buffers BUF1, BUF2, BUF3, . . . have different levels even though a same gradation voltage is applied to the buffers BUF1, BUF2, BUF3, . . . . Furthermore, when the driving voltages Vo1, Vo2, Vo3, . . . are generated with a large dispersion range of deviations, display quality and gradation representation performance of the display device decrease.

SUMMARY OF THE INVENTION

The present general inventive concept provides a method of generating a plurality of driving voltages such that all the driving voltages have a positive deviation or a negative deviation to reduce a dispersion range of deviations by approximately half and a buffer amplifier implementing the method.

The present general inventive concept also provides a driver device in which a dispersion range of deviations of a plurality of driving voltages can be reduced by approximately half when a display driver generates the plurality of driving voltages. That is, the display driver generates the driving voltages such that the dispersion ranges of deviations included in the driving voltages can be decreased by approximately half.

Additional aspects and utilities of the present general inventive concept will be set forth in part in the description which follows and, in part, will be obvious from the description, or may be learned by practice of the general inventive concept.

The foregoing and/or other aspects and utilities of the general inventive concept may be achieved by providing a method of generating a driving voltage, the method including inputting a test gradation voltage to a first input terminal and a second input terminal of a buffer, latching the logic level of a test driving voltage output from an output terminal of the buffer, setting the buffer to a first type when the logic level of the test driving voltage is high and setting the buffer to a second type when the logic level of the test driving voltage is low, and operating the buffer set to the first type or the second type to generate a driving voltage corresponding to a gradation voltage.

The buffer may be set to the first type in such a manner that the second input terminal of the buffer is connected to the output terminal of the buffer and a high-level chopping signal is input to a chopping terminal of the buffer. The gradation voltage is input to the first input terminal of the buffer and the driving voltage is output from the output terminal of the buffer when the buffer is set to the first type.

The buffer may be set to the second type in such a manner that the first input terminal of the buffer is connected to the output terminal of the buffer and a low-level chopping signal is input to the chopping terminal of the buffer. The gradation voltage is input to the second input terminal of the buffer and the driving voltage is output from the output terminal of the buffer when the buffer is set to the second type.

The foregoing and/or other aspects and utilities of the general inventive concept may also be achieved by providing a buffer amplifier including a buffer including a first input terminal, a second input terminal, a chopping terminal and an output terminal, a first type first switch to transfer a gradation voltage to the first input terminal, a first type second switch to connect the second input terminal to the output terminal, a second type first switch to transfer the gradation voltage to the second input terminal, a second type second switch to connect the first input terminal to the output terminal, a test switch to transfer a test gradation voltage to the first input terminal and the second input terminal, and a chopping signal latch to latch the logic level of a test driving voltage output from the output terminal when the test switch is on.

In a test operation, the first type first switch, the first type second switch, the second type first switch and the second type second switch are off, the test switch is on, and the chopping signal latch latches the logic level of the test driving voltage.

The buffer amplifier may perform a first type operation or a second type operation in response to the logic level of a chopping signal output from the chopping signal latch in a buffering operation.

When the buffer amplifier performs the first type operation, the test switch, the second type first switch and the second type second switch are off, the first type first switch and the first type second switch are on, the gradation voltage is input to the first input terminal, and a driving voltage corresponding to the gradation voltage is output from the output terminal. That is, the first type first switch and the first type second switch are on in response to a high-level chopping signal and the high-level chopping signal may be input to the chopping terminal when the buffer amplifier performs the first type operation.

When the buffer amplifier performs the second type operation, the test switch, the first type first switch and the first type second switch are off, the second type first switch and the second type second switch are on, the gradation voltage is input to the second input terminal, and the driving voltage corresponding to the gradation voltage is output from the output terminal. That is, the second type first switch and the second type second switch are on in response to a low-level chopping signal and the low-level chopping signal may be input to the chopping terminal when the buffer amplifier performs the second type operation.

The foregoing and/or other aspects and utilities of the general inventive concept may also be achieved by providing a method of generating a plurality of driving voltages respectively corresponding to a plurality of gradation voltages using a plurality of buffers and a plurality of chopping signal latches, the method including inputting a test gradation voltage to first input terminals and second input terminals of the buffers and latching the logic levels of test driving voltages respectively output from output terminals of the buffers on the chopping signal latches, setting buffers outputting a high-level test driving voltage from among the plurality of buffers to a first type and setting buffers outputting a low-level test driving voltage from among the plurality of buffers to a second type, and respectively inputting the plurality of gradation voltages to the buffers set to the first type or the second type to generate the plurality of driving voltages.

In the buffers set to the first type from among the plurality of buffers, high-level chopping signals may be respectively output from the chopping signal latches respectively corresponding to the buffers may be respectively input to chopping terminals of the buffers, the output terminals of the buffers are connected to the second input terminals of the buffers, corresponding gradation voltages may be respectively input to the first input terminals of the buffers, and corresponding driving voltages may be respectively output from the output terminals of the buffers.

In the buffers set to the second type from among the plurality of buffers, low-level chopping signals may be respectively output from the chopping signal latches respectively corresponding to the buffers may be respectively input to chopping terminals of the buffers, the output terminals of the buffers are connected to the first input terminals of the buffers, corresponding gradation voltages may be respectively input to the second input terminals of the buffers, and corresponding driving voltages may be respectively output from the output terminals of the buffers.

The plurality of buffers and the plurality of chopping signal latches may be included in a display driver, and the display driver may receive the plurality of gradation voltages, generate the plurality of driving voltages and output the plurality of driving voltages to a display panel. The display driver may include N buffers and N chopping signal latches when the display panel includes N data lines. In the present embodiment, N is an integer.

The foregoing and/or other aspects and utilities of the general inventive concept may also be achieved by providing a driving device usable with a display panel, the driving device including a plurality of buffers to receive input voltages and to output driving voltages, respectively, each of the buffers having a positive or negative deviation corresponding to a difference between the respective input voltage and the driving voltage, and a plurality of latches to set operation type of each of the buffers such that all of the buffers have positive deviation or all of the buffers have negative deviation to reduce a dispersion range of the deviations.

The foregoing and/or other aspects and utilities of the general inventive concept may also be achieved by providing a method of generating a plurality of driving voltages from a plurality of input voltages by using a plurality of buffers, the method including determining whether each of the buffers has a positive deviation or a negative deviation, setting buffers having a positive deviation to a first type and setting buffers having a negative deviation to a second type, and generating the plurality of driving voltages from the plurality of input voltages by using the plurality of buffers set to the first type or the second type, wherein all of the driving voltages respectively have positive deviation from corresponding input voltage, or all of the driving voltages respectively have negative deviation from corresponding input voltage.

The foregoing and/or other aspects and utilities of the general inventive concept may also be achieved by providing a computer-readable recording medium having embodied thereon a computer program to execute a method of generating a plurality of driving voltages from a plurality of input voltages by using a plurality of buffers, wherein the method including determining whether each of the buffers has a positive deviation or a negative deviation, setting buffers having a positive deviation to a first type and setting buffers having a negative deviation to a second type, and generating the plurality of driving voltages from the plurality of input voltages by using the plurality of buffers set to the first type or the second type, wherein all of the driving voltages respectively have positive deviation from corresponding input voltage, or all of the driving voltages respectively have negative deviation from corresponding input voltage.

BRIEF DESCRIPTION OF THE DRAWINGS

The above and other features and utilities of the present general inventive concept will become more apparent by describing in detail exemplary embodiments thereof with reference to the attached drawings in which.

DETAILED DESCRIPTION OF THE PREFERRED EMBODIMENTS

Figure 1:
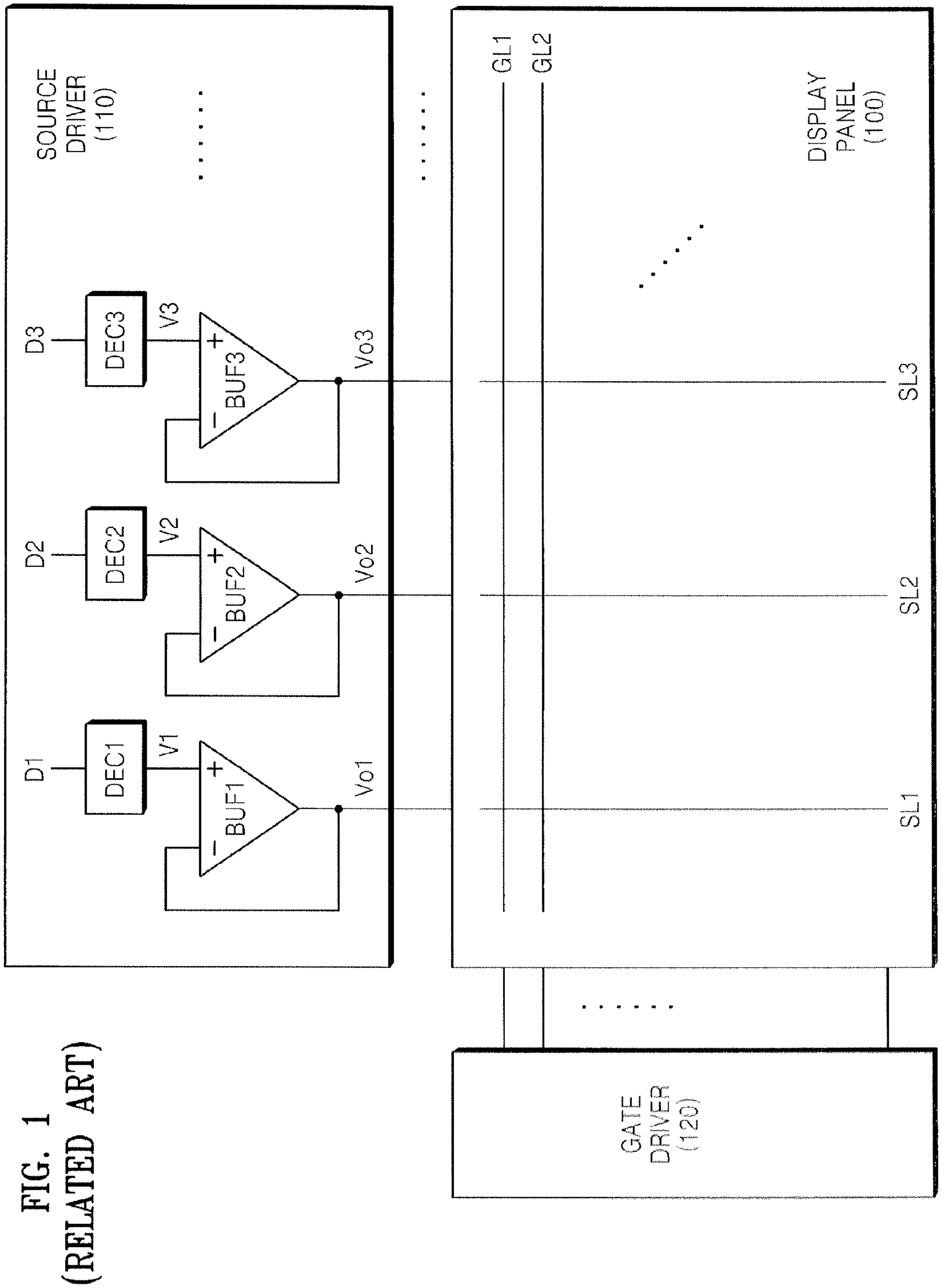
FIG. 1 (RELATED ART)
FIG. 1 illustrates a conventional display device.

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

Figure 2A:
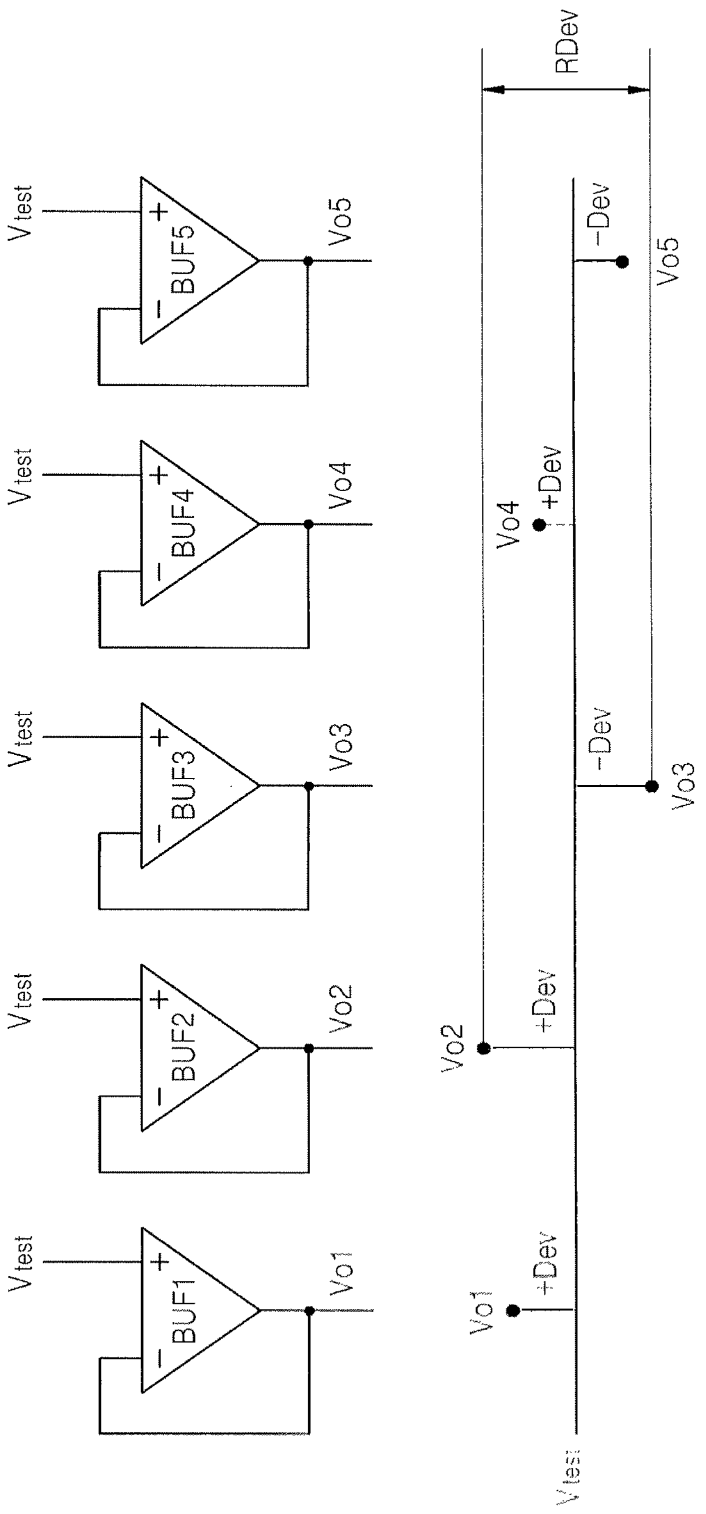
FIGS. 2A, 2B and 2C illustrate dispersion of deviations included in driving voltages.
Figure 2B:
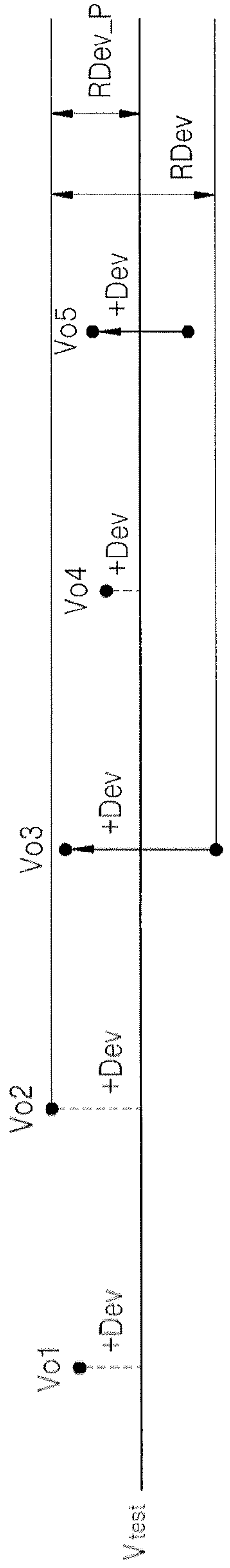
Figure 2C:
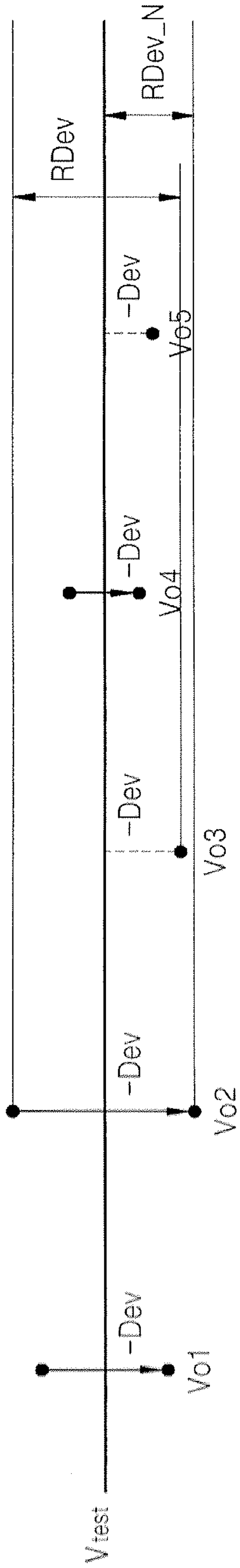

FIGS. 2A, 2B and 2C illustrate dispersion of deviations included in driving voltages. A plurality of buffers BUF1 through BUF5 illustrated in FIG. 2A are included in a display driver, for example, the source driver 110 illustrated in FIG. 1.

Referring to FIG. 2A, driving voltages Vo1 through Vo5 respectively generated by the buffers BUF1 through BUF5 when a test gradation voltage Vtest is input to the buffers BUF1 through BUF5 have different deviation polarities and deviation sizes. In FIG. 2A, the driving voltages Vo1, Vo2 and Vo4 have a positive deviation _Dev and the driving voltages Vo3 and Vo5 have a negative deviation −Dev. Furthermore, the driving voltages Vo1, Vo2 and Vo4 having the positive deviation +Dev have different deviation sizes (That is, |+Dev|) and the driving voltages Vo3 and V05 having the negative deviation −Dev also have different deviation sizes (|−Dev|).

In FIG. 2A, RDev represents a dispersion range of deviations. To improve the display quality of a display device, the dispersion range of deviations must be reduced. Accordingly, in an embodiment of the present general inventive concept, deviation polarities are standardized as a positive deviation or a negative deviation so as to reduce the dispersion range of deviations by approximately half, that is, by approximately fifty percent.

Specifically, the driving voltages Vo1, Vo2 and Vo4 having the positive deviation +Dev are generated and output as is, and the driving voltages Vo3 and Vo5 having the negative deviation −Dev are generated and the negative deviation −Dev is inverted, as illustrated in FIG. 2B. Accordingly, all the driving voltages Vo1 through Vo5 have a positive deviation, and thus the dispersion range of deviations can be reduced by approximately half. In FIG. 2B, RDev_P represents a dispersion range of positive deviations. As illustrated in FIG. 2B, the dispersion range of deviations is reduced from RDev to RDev_P.

Otherwise, the driving voltages Vo1, Vo2 and Vo4 having the positive deviation +Dev are generated and the positive deviation +Dev is inverted, and the driving voltages Vo3 and Vo5 having the negative deviation −Dev are generated and output as is, as illustrated in FIG. 2C. Accordingly, all the driving voltages Vo1 through Vo5 have a negative deviation, and thus the dispersion range of deviations can be reduced by approximately half. In FIG. 2C, RDev_N represents a dispersion range of negative deviations. As illustrated in FIG. 2C, the dispersion range of deviations is reduced from RDev to RDev_N.

As described above, the dispersion range of deviations can be decreased by approximately half when deviation polarities are standardized although deviation sizes are not reduced. To achieve this, a buffer amplifier to invert a deviation polarity is required. The buffer amplifier illustrated with reference to FIGS. 3A and 3B and an operation of the buffer amplifier is described with reference to FIGS. 4A, 4B and 4C.

The buffer amplifier illustrated in FIGS. 3A, 3B, 4A, 4B and 4C corresponds to one of a plurality of buffer amplifiers included in a display driver. For example, the source driver 110 illustrated in FIG. 1 can include a plurality of buffer amplifiers illustrated in FIGS. 3A, 3B, 4A, 4B and 4C instead of the plurality of buffers BUF1, BUF2, BUF3, . . . illustrated in FIG. 1. Referring to FIGS. 3A, 3B, 4A, 4B and 4C, the buffer amplifier includes a buffer BUF1, a first type first switch SW11, a first type second switch SW12, a second type first switch SW21, a second type second switch SW22, a test switch SW31, a latch switch SW32 and a chopping signal latch L1. In FIGS. 3A, 3B, 4A, 4B and 4C, a first power supply voltage VDD has a logic high level and a second power supply voltage VSS has a logic low level.

The buffer BUF1 includes a first input terminal T1, a second input terminal T2, a chopping terminal receiving a chopping signal CHP, an inverted chopping terminal receiving an inverted chopping signal CHPB, a first power terminal receiving the first power supply voltage VDD, a second power terminal receiving the second power supply voltage VSS, and an output terminal to output a test driving voltage Vot1 or a driving voltage Vo1. The first type first switch SW11 transfers a gradation voltage V1 to the first input terminal T1 of the buffer BUF1. The first type second switch SW12 connects the second input terminal T2 and the output terminal of the buffer BUF1. The second type first switch SW21 transfers the gradation voltage V1 to the second input terminal T2 of the buffer BUF1. The second type second switch SW22 connects the first input terminal T1 and the output terminal of the buffer BUF1. The test switch SW31 transfers a test gradation voltage Vtest to the first input terminal T1 and the second input terminal T2 of the buffer BUF1.

The chopping signal latch L1 latches the logic level of the test driving voltage Vot1 output from the output terminal of the buffer BUF1 when the test switch SW31 and the latch switch SW32 are on. The chopping signal latch L1 includes a first inverter INV1 and a second inverter INV2. The chopping signal CHP is output from the first inverter INV1 and the inverted chopping signal CHPB is output from the second inverter INV2 in FIG. 3A whereas the chopping signal CHP is output from the second inverter INV2 and the inverted chopping signal CHPB is output from the first inverter INV1 in FIG. 3B. The chopping signal CHP corresponds to the logic level of the test driving voltage Vot1 in the embodiment illustrated in FIG. 3A and the chopping signal CHP corresponds to the inverted logic level of the test driving voltage Vot1 in the embodiment illustrated in FIG. 3B. That is, the inverted chopping signal CHPB corresponds to the inverted logic level of the test driving voltage Vot1 in the embodiment illustrated in FIG. 3A and the inverted chopping signal CHPB corresponds to the logic level of the test driving voltage Vot1 in the embodiment illustrated in FIG. 3B. Although only the embodiment illustrated in FIG. 3A will be explained hereinafter, those of ordinary skill in the art can also understand the embodiment illustrated in FIG. 3B.

Figure 3A:
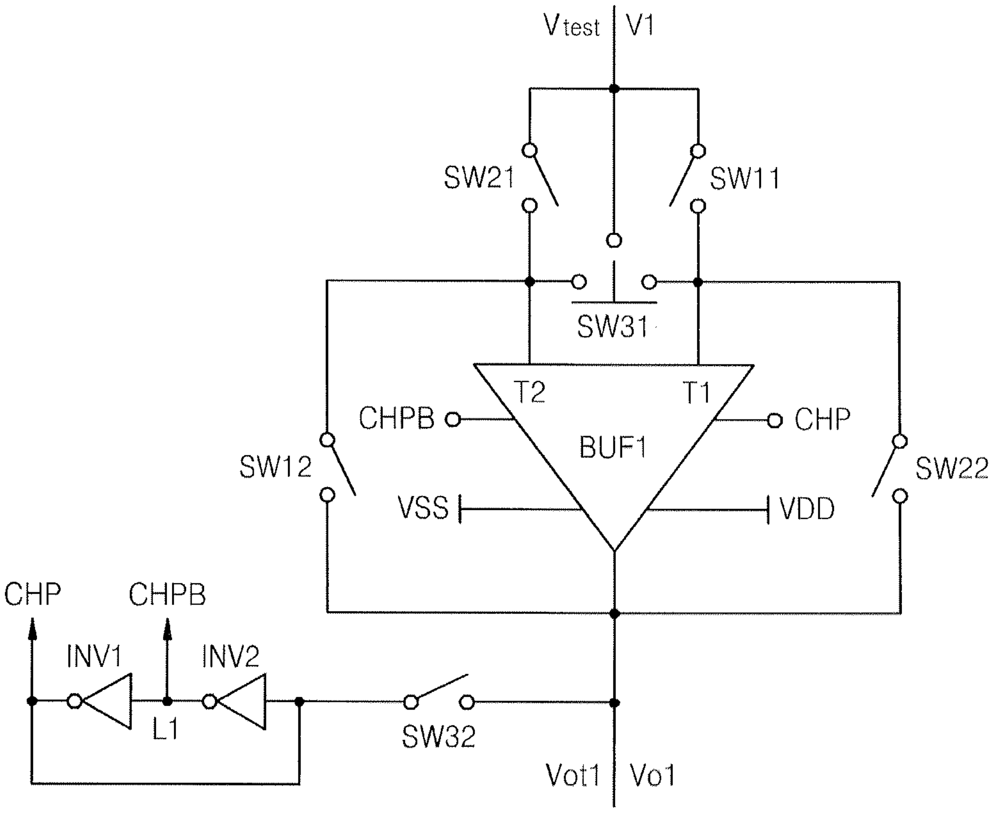
FIGS. 3A and 3B illustrate a buffer amplifier according to an embodiment of the present general inventive concept.
Figure 3B:
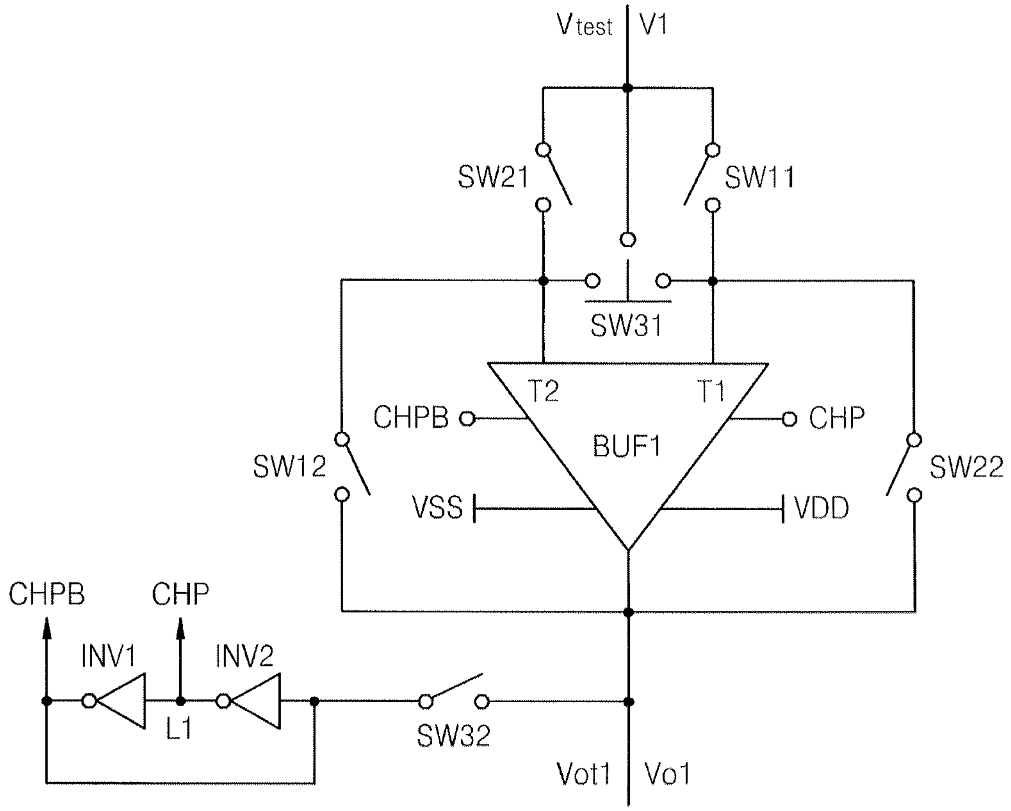

The operation of the buffer amplifier illustrated in FIGS. 3A and 3B can be divided into a test operation and a buffering operation. In the buffering operation, the buffer amplifier performs a first type operation or a second type operation in response to the logic level of the chopping signal CHP.

Figure 4A:
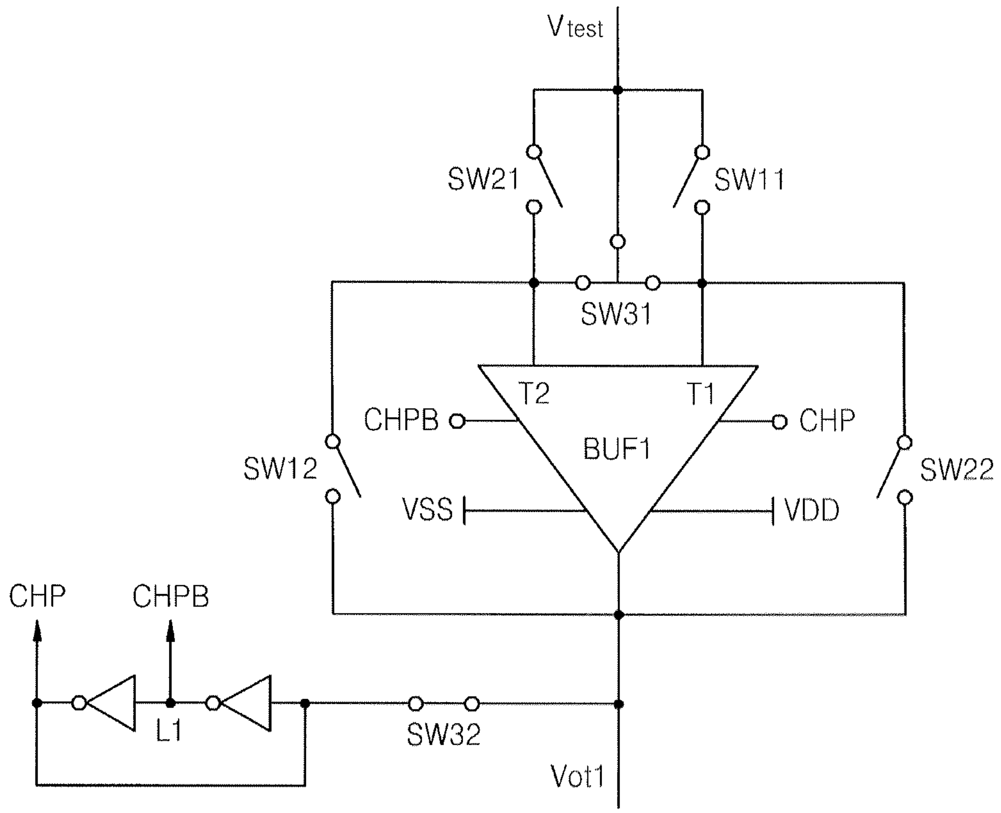
FIGS. 4A, 4B and 4C illustrate an operation of the buffer amplifier illustrated in FIG. 3A.

The test operation of the buffer amplifier will now be explained with reference to FIG. 4A. Referring to FIG. 4A, the first type first switch SW1, the first type second switch SW12, the second type first switch SW21 and the second type second switch SW22 are off and the test switch SW31 and the latch switch SW32 are on in the test operation. Accordingly, the test gradation voltage Vtest is input to the first input terminal T1 and the second input terminal T2 of the buffer BUF1, and thus the buffer BUF1 operates as a comparator.

If the buffer BUF1 has offset characteristic that induces a positive deviation +Dev, the output terminal of the buffer BUF1 outputs the first power supply voltage VDD as the test driving voltage Vot1 in terms of a saturation characteristic of a comparator operation. In this case, the test driving voltage Vot1 has a logic high level, and thus the chopping signal latch L1 latching the logic level of the test driving signal Vot1 outputs the chopping signal CHP having a logic high level. If the buffer BUF1 has an offset characteristic that induces a negative deviation −Dev, the output terminal of the buffer BUF1 outputs the second power supply voltage VSS as the test driving voltage Vot1 in terms of the saturation characteristic of the comparator operation. In this case, the test driving voltage Vot1 has a logic low level, and thus the chopping signal latch L1 latching the logic level of the test driving signal Vot1 outputs the chopping signal CHP having a logic low level.

Figure 4B:
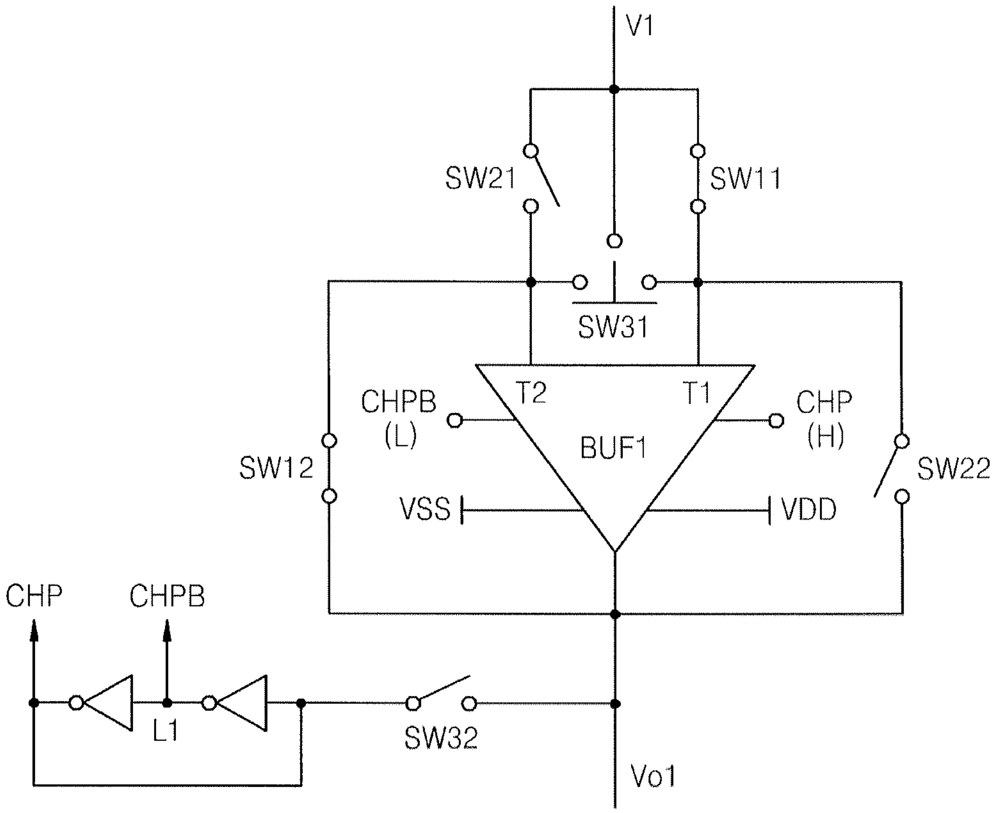
Figure 4C:
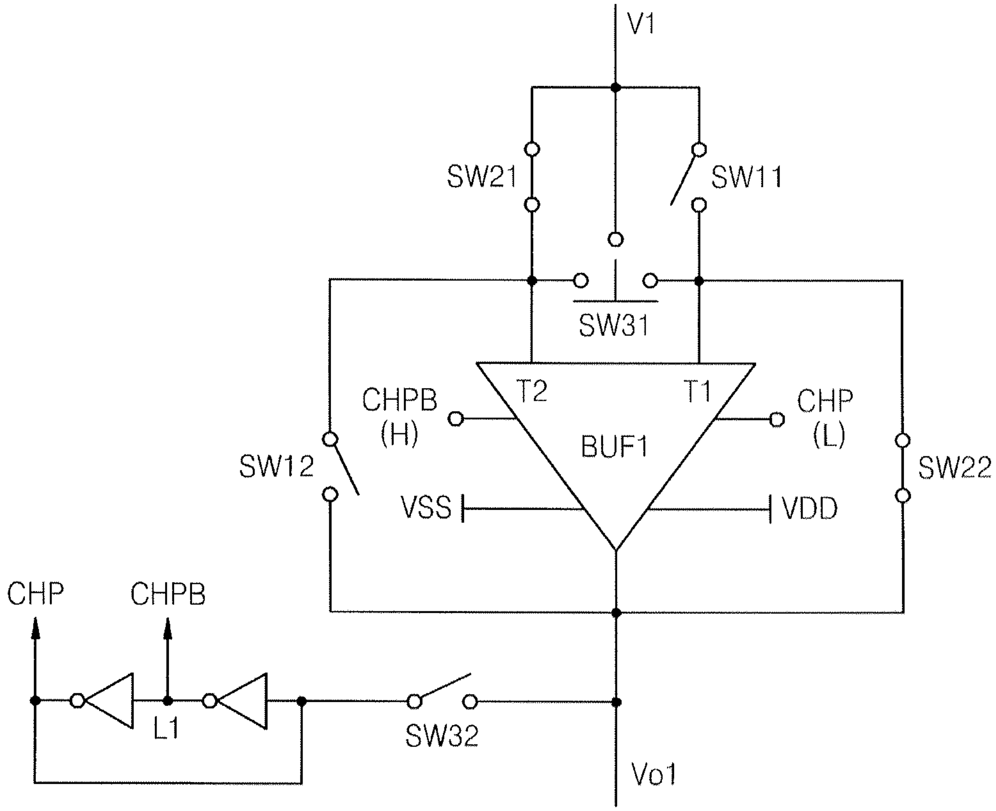

The buffering operation of the buffer amplifier will now be explained with reference to FIGS. 4B and 4C. When the logic high test driving voltage Vot1 is output as a test operation result, the buffer amplifier is set to a first type in response to the high-level chopping signal CHP in the buffering operation. That is, the second input terminal T2 of the buffer BUF1 is connected to the output terminal of the buffer BUF1 and the high-level chopping signal CHP is input to the chopping terminal of the buffer BUF1, as illustrated in FIG. 4B. Specifically, the test switch SW31, the second type first switch SW21 and the second type second switch SW22 are off, the first type first switch SW11 and the first type second switch SW12 are on, the high-level chopping signal CHP is input to the chopping terminal of the buffer BUF1, and the inverted chopping signal CHPB having a logic low level is input to the inverted chopping terminal of the buffer BUF1. Accordingly, the gradation voltage V1 is input to the first input terminal T1 of the buffer BUF1 and the driving voltage Vo1 corresponding to the gradation voltage V1 is output from the output terminal of the buffer BUF1. In this case, the driving voltage Vo1 has a positive deviation +Dev.

When the test driving voltage Vot1 having a logic low level is output as a test operation result, the buffer amplifier is set to a second type in response to the chopping signal CHP having a logic low level in the buffering operation. That is, the first input terminal T1 of the buffer BUF1 is connected to the output terminal of the buffer BUF1 and the low-level chopping signal CHP is input to the chopping terminal of the buffer BUF1, as illustrated in FIG. 4C. Specifically, the test switch SW31, the first type first switch SW11 and the first type second switch SW12 are off, the second type first switch SW21 and the second type second switch SW22 are on, the low-level chopping signal CHP is input to the chopping terminal of the buffer BUF1, and the inverted chopping signal CHPB having a logic high level is input to the inverted chopping terminal of the buffer BUF1. Accordingly, the gradation voltage V1 is input to the second input terminal T2 of the buffer BUF1 and the driving voltage Vo1 corresponding to the gradation voltage V1 is output from the output terminal of the buffer BUF1. In this case, the driving voltage Vo1 also has a positive deviation +Dev.

If the buffer amplifier is set to the first type even though the test driving voltage Vot1 having a logic low level is output as a test operation result, that is, if the test switch SW31, the second type first switch SW21 and the second type second switch SW22 are off, the first type first switch SW11 and the first type second switch SW12 are on, and the high-level chopping signal CHP is input to the chopping terminal of the buffer BUF1, the driving voltage Vo1 output from the output terminal of the buffer BUF1 has a negative deviation −Dev. FIG. 3B illustrates that the high-level chopping signal CHP is input to the chopping terminal of the buffer BUF1 when the test driving voltage Vot1 has a logic low level.

FIGS. 5A, 5B, 5C and 5D illustrate a method of generating a plurality of driving voltages Vo1 through Vo5 respectively corresponding to a plurality of gradation voltages V1 through V5 using a plurality of buffers BUF1 through BUF5 and a plurality of chopping signal latches L1 through L5 according to an embodiment of the present general inventive concept. The plurality of buffers BUF1 through BUF5 and the plurality of chopping signal latches L1 through L5 illustrated in FIGS. 5A, 5B, 5C and 5D can be included in a display driver, for example, the source driver 110 illustrated in FIG. 1. That is, the source driver 110 can include the plurality of buffers BUF1 through BUF5 and the plurality of chopping signal latches L1 through L5 illustrated in FIGS. 5A, 5B, 5C and 5D instead of the buffers illustrated in FIG. 1. In this case, the source driver 110 illustrated in FIG. 1 receives the plurality of gradation voltages V1 through V5, generates the plurality of driving voltages Vo1 through Vo5 and outputs the generated driving voltages Vo1 through Vo5 to the display panel 100 illustrated in FIG. 1. When the display panel 100 illustrated in FIG. 1 includes N data lines, that is, N source lines, the source driver 110 illustrated in FIG. 1 can include N buffers and N chopping signal latches.

Figure 5A:
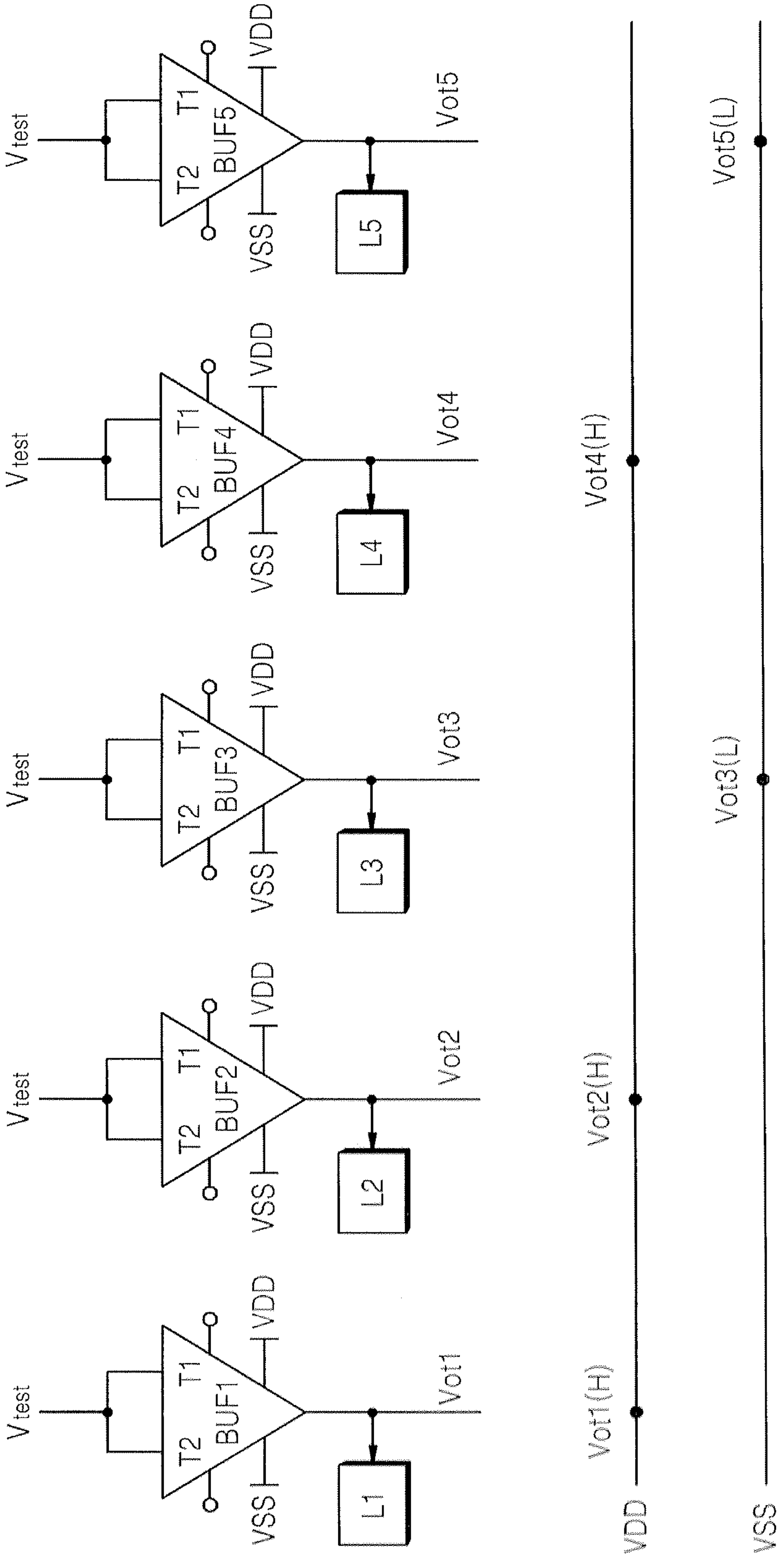
FIGS. 5A, 5B, 5C and 5D illustrate a method of generating a driving voltage according to an embodiment of the present general inventive concept.
Figure 7:
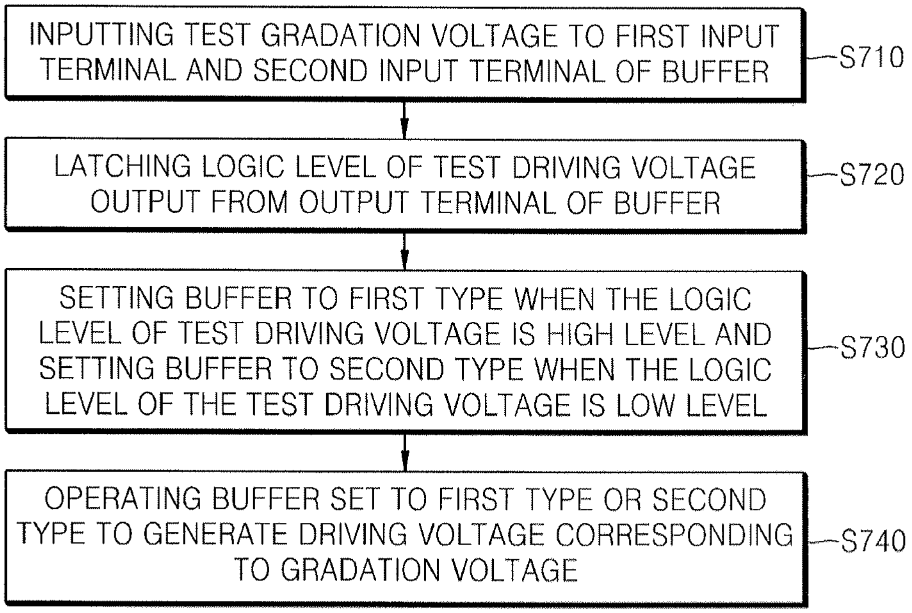
FIG. 7 illustrates a flowchart illustrating a method of generating a driving voltage according to an embodiment of the present general inventive concept.

Referring to FIGS. 5A and 7, a test gradation signal Vtest is input to a first input terminal T1 and a second input terminal T2 of each of the buffers BUF1 through BUF5 (operation S710). The chopping signal latches L1 through L5 respectively latch the logic levels of the test driving signals Vot1 through Vot5 respectively output from output terminals of the buffers BUF1 through BUF5 (operation S720). In FIG. 5A, the test driving voltages Vot1, Vot2 and Vot4 correspond to a first power supply voltage VDD, that is, a logic high level, and the test driving voltages Vo3 and Vo5 correspond to a second power supply voltage VSS, that is, a logic low level.

Figure 5B:
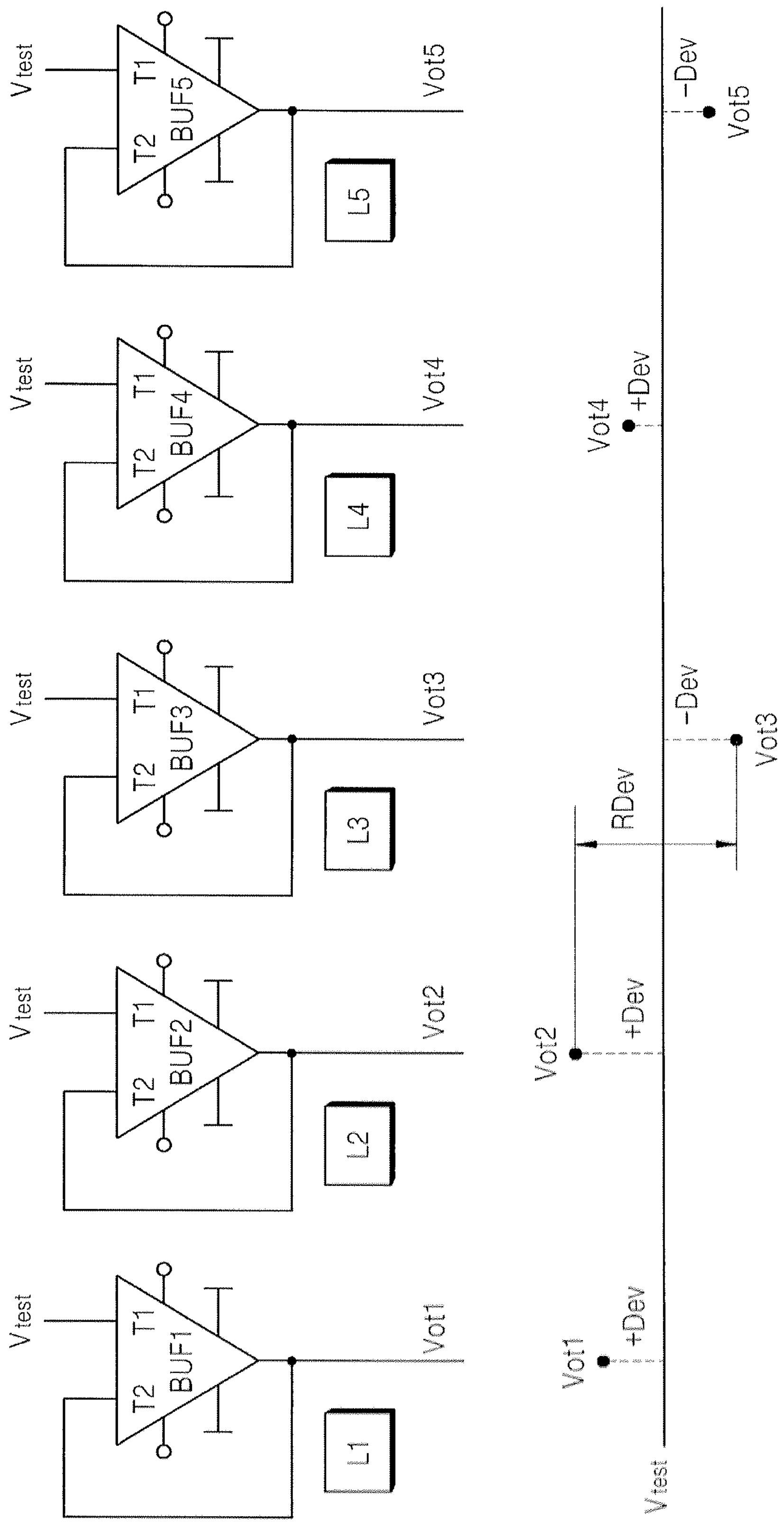

In consideration of the result of the test operation illustrated in FIG. 5A, when the buffers BUF1 through BUF5 perform a first type operation, as illustrated in FIG. 5B, that is, when all the buffers BUF1 through BUF5 buffer the test gradation voltage Vtest in the first type operation, the test driving voltages Vot1, Vot2 and Vot4 have a positive deviation +Dev and the test driving voltages Vo3 and Vo5 have a negative deviation −Dev, as illustrated in FIG. 5B.

Figure 5C:
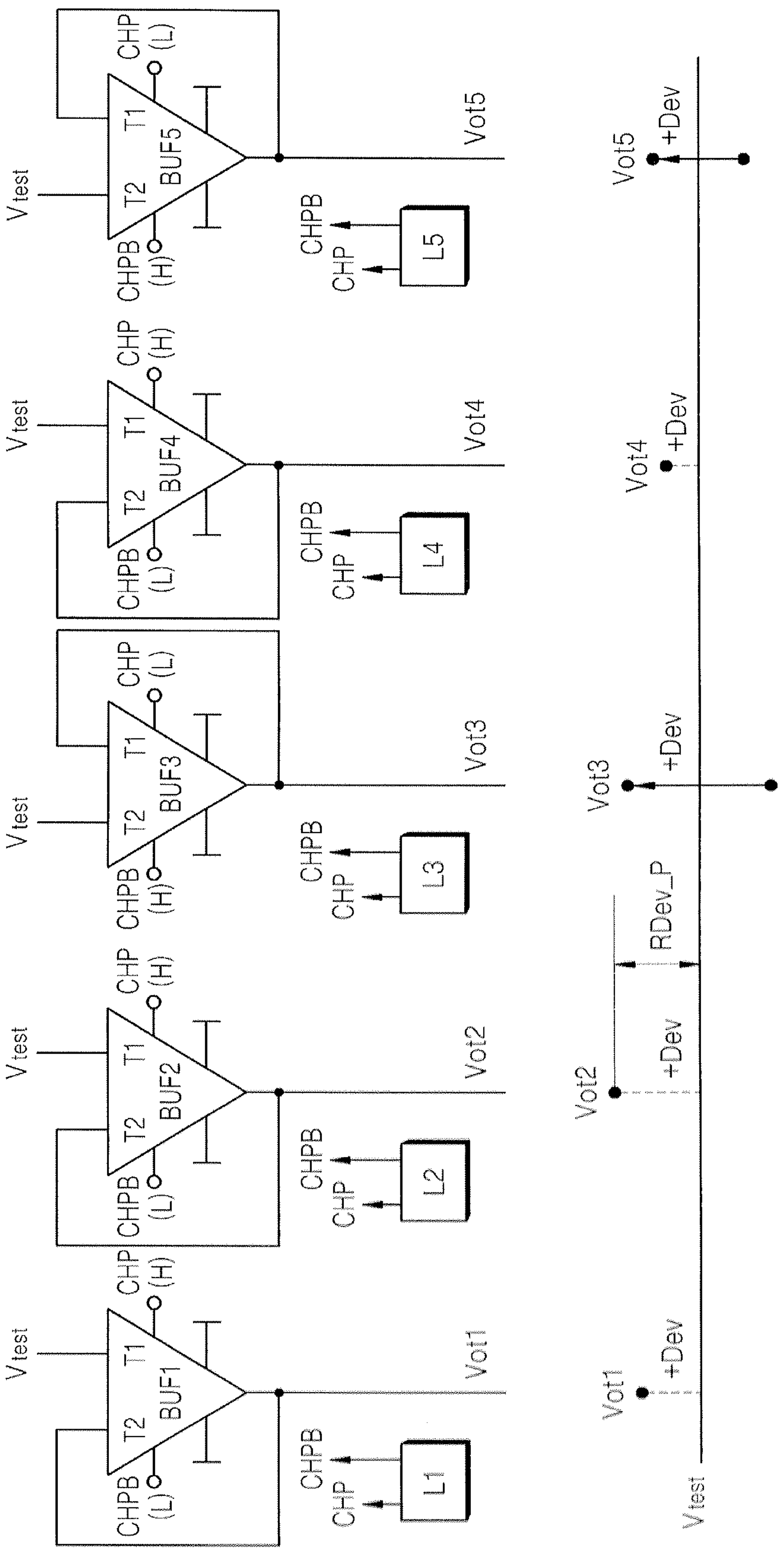

Referring to FIG. 7, when the buffers BUF1 through BUF5 operates as illustrated in FIG. 5C, that is, when the buffers BUF1, BUF2 and BUF4 buffer the test gradation voltage Vtest in response to a chopping signal CHP having a high level in the first type operation and the buffers BUF3 and BUF5 buffer the test gradation signal Vtest in response to the chopping signal CHP having a low level in a second type operation, all the test driving voltages Vo1 through Vo5 have a positive deviation +Dev, as illustrated in FIG. 5C (operation S740). In a comparison of FIG. 5B to FIG. 5C, a dispersion range of deviations is reduced by approximately half. That is, the dispersion range of deviations can be decreased from RDev illustrated in FIG. 5B to RDev_P illustrated in FIG. 5C.

Figure 5D:
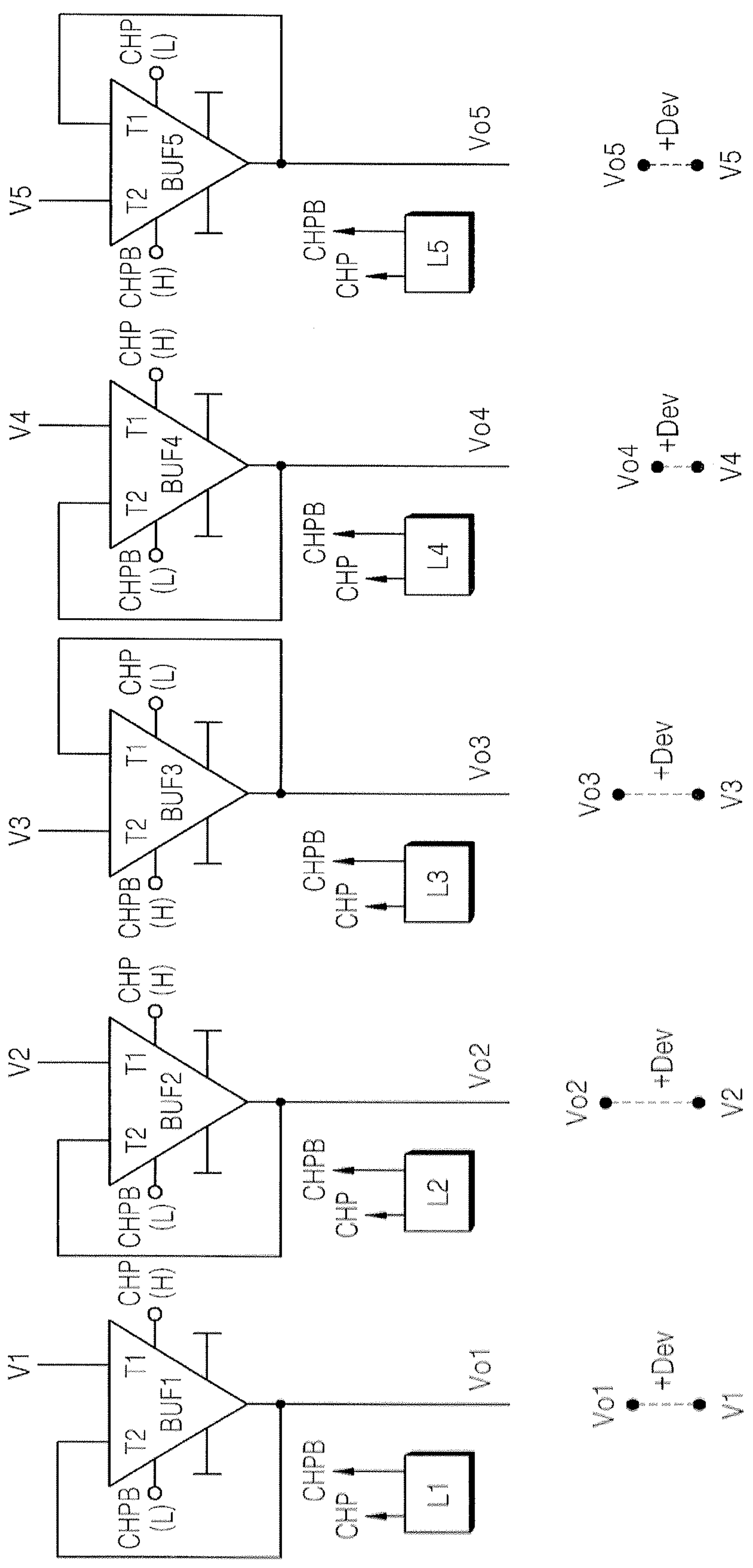

A buffering operation illustrated in FIG. 5D is performed on a basis of the result of the test operation illustrated in FIG. 5A. Specifically, referring to FIGS. 5A, 5D and 7, the buffers BUF1, BUF2 and BUF4 outputting a high-level test driving voltage from among the buffers BUF1 through BUF5 illustrated in FIG. 5A are set to a first type and the buffers BUF3 and BUF5 outputting a low-level test driving voltage are set to a second type, as illustrated in FIG. 5D (operation S730).

The buffers BUF1, BUF2 and BUF4 respectively buffer the gradation voltages V1, V2 and V4 in response to a high-level chopping signal CHP in the first type operation and generate the driving voltages Vo1, Vo2 and Vo4. In this case, high-level chopping signals CHP respectively output from the chopping signal latches L1, L2 and L4 respectively corresponding to the buffers BUF1, BUF2 and BUF4 are respectively applied to the chopping terminals of the buffers BUF1, BUF2 and BUF4. The output terminals of the buffers BUF1, BUF2 and BUF4 are respectively connected to the second input terminals T2 of the buffers BUF1, BUF2 and BUF4. The gradation voltages V1, V2 and V4 are respectively input to the first input terminals T1 of the buffers BUF1, BUF2 and BUF4 and the driving voltages Vo1, Vo2 and Vo4 are respectively output from the output terminals of the buffers BUF1, BUF2 and BUF4.

The buffers BUF3 and BUF5 respectively buffer the gradation voltages V3 and V5 in response to a low-level chopping signal CHP in the second type operation and generate the driving voltages Vo3 and Vo5. In this case, low-level chopping signals CHP respectively output from the chopping signal latches L3 and L5 respectively corresponding to the buffers BUF3 and BUF5 are respectively applied to the chopping terminals of the buffers BUF3 and BUF5. The output terminals of the buffers BUF3 and BUF5 are respectively connected to the first input terminals T1 of the buffers BUF3 and BUF5. The gradation voltages V3 and V5 are respectively input to the second input terminals T2 of the buffers BUF3 and BUF5 and the driving voltages Vo3 and Vo5 are respectively output from the output terminals of the buffers BUF3 and BUF5.

As illustrated in FIGS. 5A, 5B, 5C and 5D, all the driving voltages Vo1 through Vo5 have a positive deviation +Dev. Otherwise, all the driving voltages Vo1 through Vo5 can have a negative deviation 1Dev, which is not illustrated. As described above, the dispersion range of deviations can be reduced by approximately half when deviation polarities of a plurality of driving voltages are standardized when the driving voltages are generated.

Figure 6A:
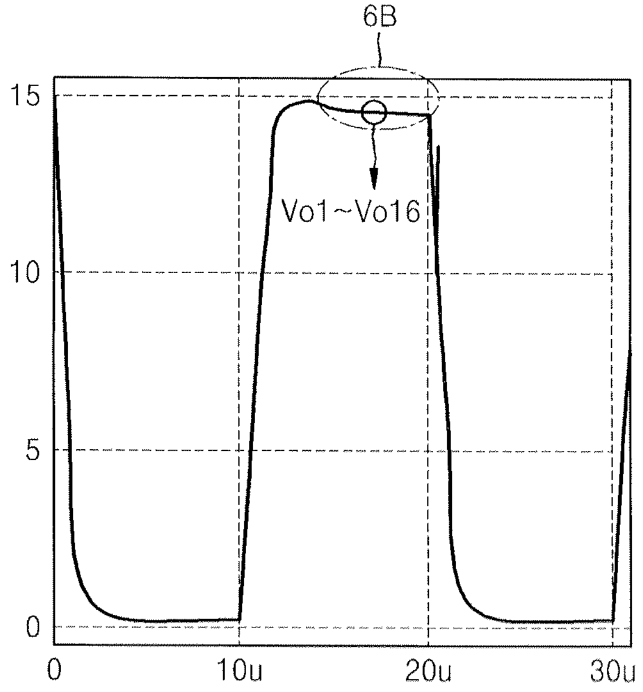
FIGS. 6A and 6B illustrate deviations included in driving voltages generated by a source driver illustrated in FIG. 1.
Figure 6B:
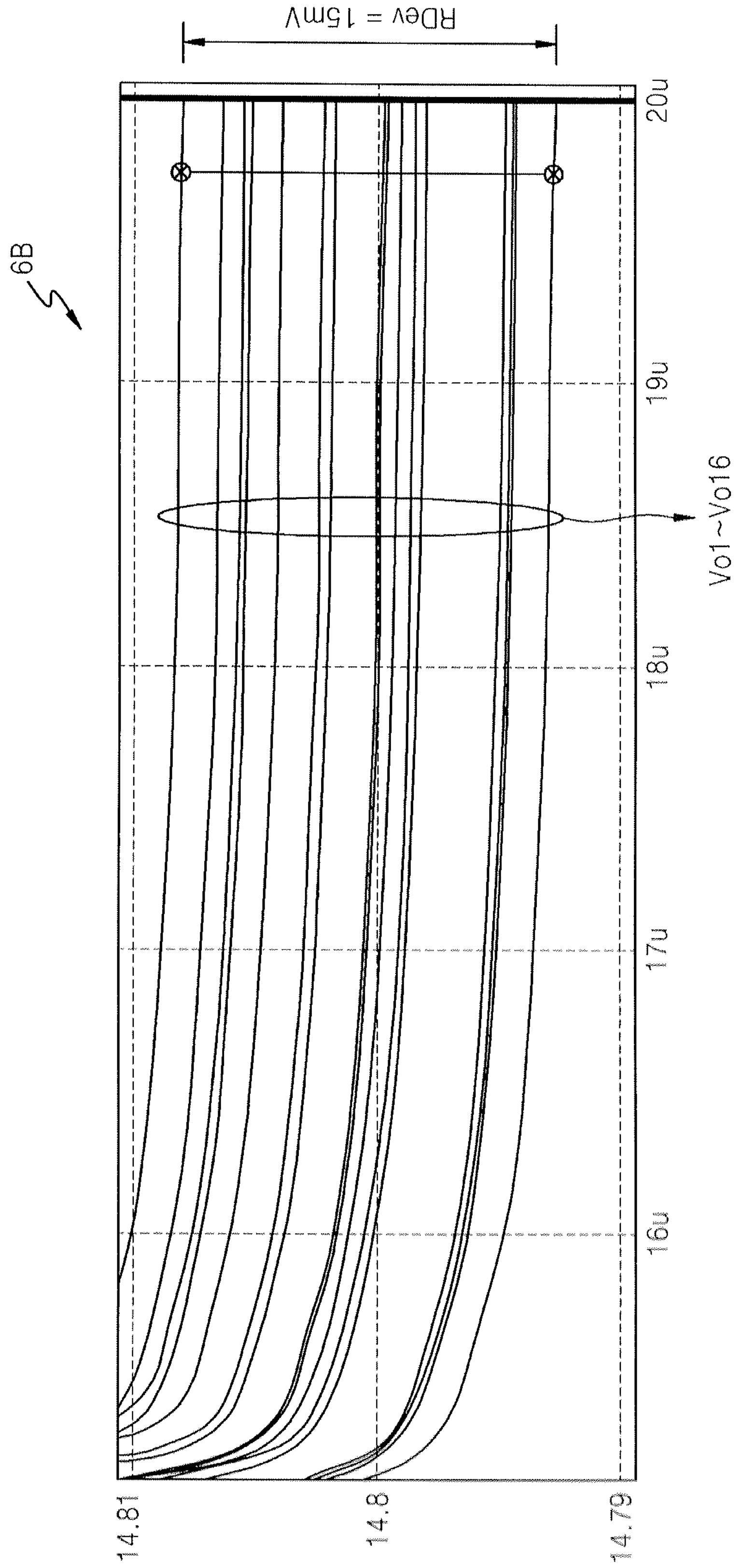
Figure 6C:
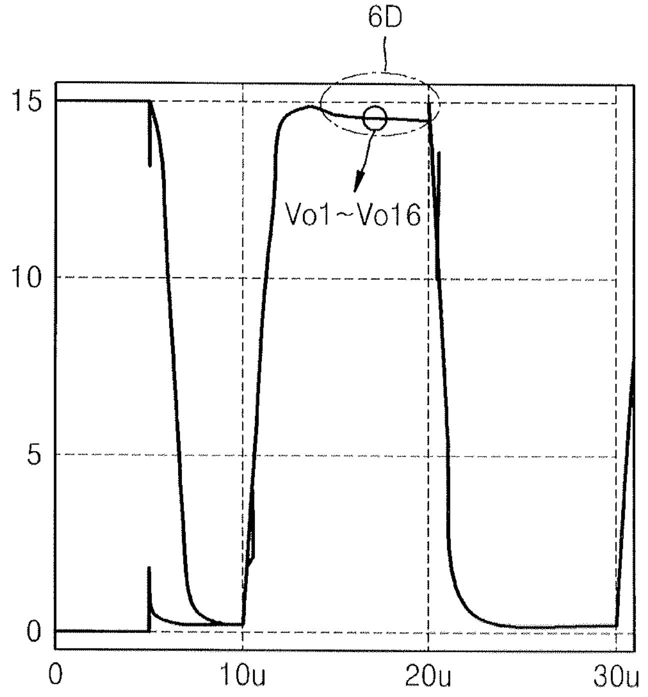
FIGS. 6C and 6D illustrate deviations included in driving voltages according to an embodiment of the present general inventive concept.
Figure 6D:
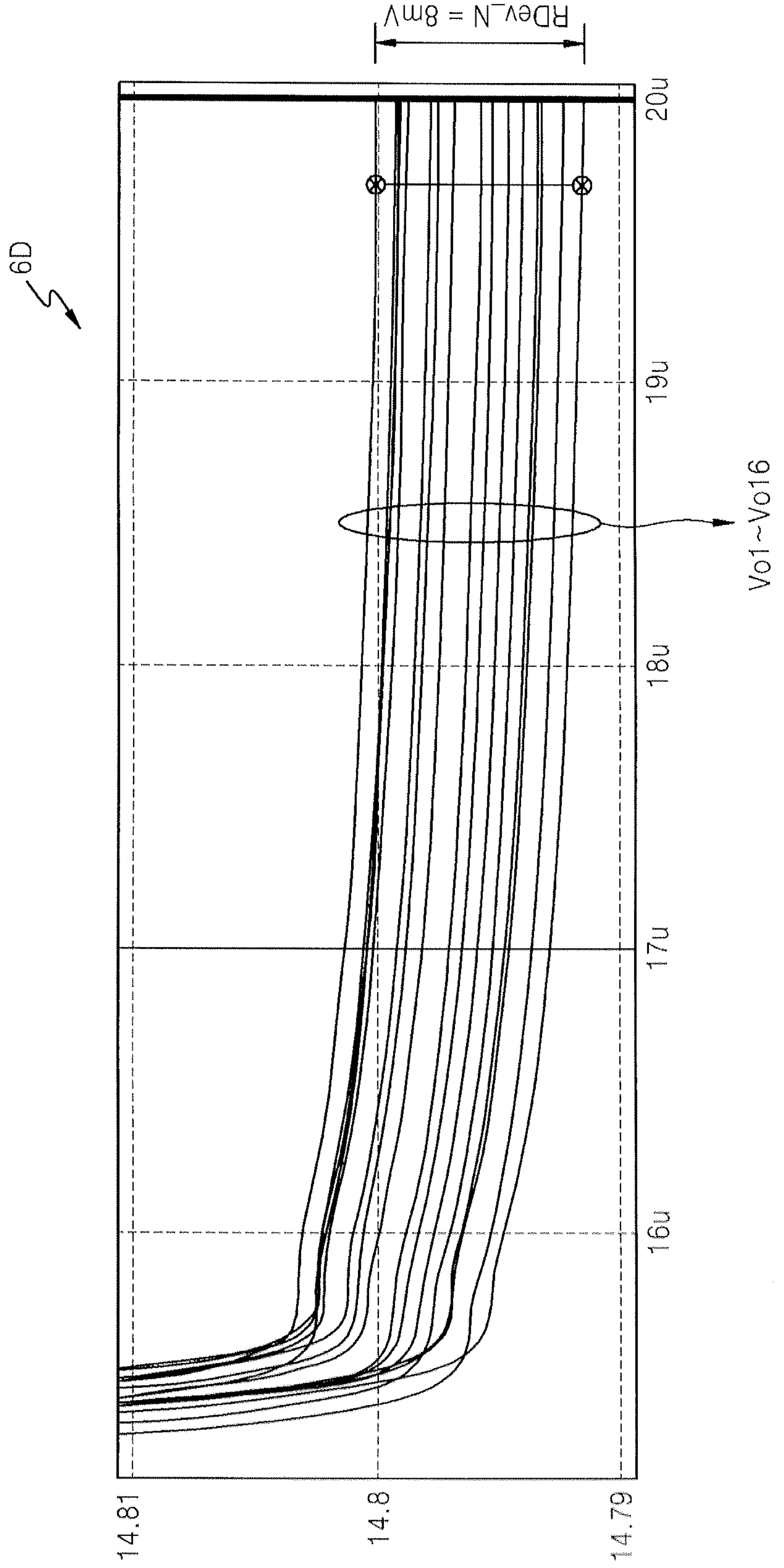

FIGS. 6A and 6B illustrate deviations included in driving voltages generated by the source driver 110 illustrated in FIG. 1 and FIGS. 6C and 6D illustrate deviations included in driving voltages according to an embodiment of the present general inventive concept. In FIGS. 6A, 6B, 6C and 6D, the horizontal axis represents a time [μs] and the vertical axis represents a driving voltage [V].

If the source driver 110 illustrated in FIG. 1 includes 16 buffers, for example, driving voltages Vo1 through Vo16 as illustrated in FIG. 6A can be generated when a pulse signal having a magnitude of 15V and a pulse width of 10 μs is input to the buffers. FIG. 6B magnifies a portion 6B of FIG. 6A. In FIG. 6B, the dispersion range of deviations RDev corresponds to 15 mV.

If 16 buffer amplifiers illustrated in FIG. 3B according to an embodiment of the present general inventive concept is used, driving voltages Vo1 through Vo16 as illustrated in FIG. 6C can be generated. FIG. 6D magnifies a portion 6D of FIG. 6C. In FIG. 6D, the dispersion range of deviations RDev_N corresponds to 8 mV. In a comparison of FIG. 6B to FIG. 6D, the dispersion range of deviations can be reduced by approximately half.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

While the present general inventive concept has been particularly illustrated and described with reference to exemplary embodiments thereof, it will be understood by those of ordinary skill in the art that various changes in form and details may be made therein without departing from the spirit and scope of the present general inventive concept as defined by the following claims.

What is claimed is:

1. A method of generating a driving voltage, the method comprising:

inputting a test gradation voltage to a first input terminal and a second input terminal of a buffer, the buffer further including a chopping terminal, an output terminal, a first type first switch to transfer a gradation voltage to the first input terminal, a first type second switch to connect the second input terminal to the output terminal, a second type first switch to transfer the gradation voltage to the second input terminal, a second type second switch to connect the first input terminal to the output terminal, a test switch to transfer a test gradation voltage to the first input terminal and the second input terminal, and a chopping signal latch to latch the logic level of a test driving voltage output from the output terminal when the test switch is on;

latching the logic level of the test driving voltage output from the output terminal of the buffer;

setting the buffer to a first type when the logic level of the test driving voltage is high level and setting the buffer to a second type when the logic level of the test driving voltage is low level; and operating the buffer set to the first type or the second type to generate a driving voltage corresponding to the gradation voltage, wherein setting the buffer to a first type comprises setting the test switch, the second type first switch; and the second type second switch to off, setting the first type first switch and the first type second switch to on, inputting the gradation voltage to the first input terminal, and outputting the driving voltage corresponding to the gradation voltage from the output terminal, wherein the first type first switch, the first type second switch, the second type first switch, and the second type second switch are off, the test switch is on, and the chopping signal latch latches the logic level of the test driving voltage in a test operation.

2. The method of claim 1, wherein the buffer is set to the first type in such a manner that the second input terminal of the buffer is connected to the output terminal of the buffer and a high-level chopping signal is input to the chopping terminal.

3. The method of claim 2, wherein the gradation voltage is input to the first input terminal of the buffer and the driving voltage is output from the output terminal of the buffer when the buffer is set to the first type.

4. The method of claim 1, wherein the buffer is set to the second type in such a manner that the first input terminal of the buffer is connected to the output terminal of the buffer and a low-level chopping signal is input to the chopping terminal.

5. The method of claim 4, wherein the gradation voltage is input to the second input terminal of the buffer and the driving voltage is output from the output terminal of the buffer when the buffer is set to the second type.

6. The method of claim 1, wherein the logic level of the test driving voltage is high level when the buffer has an offset characteristic that induces a positive deviation.

7. The method of claim 1, wherein the logic level of the test driving voltage is low level when the buffer has an offset characteristic that induces a negative deviation.

8. A buffer amplifier, comprising:

a buffer including a first input terminal, a second input terminal, a chopping terminal and an output terminal;

a first type first switch to transfer a gradation voltage to the first input terminal;

a first type second switch to connect the second input terminal to the output terminal;

a second type first switch to transfer the gradation voltage to the second input terminal;

a second type second switch to connect the first input terminal to the output terminal;

a test switch to transfer a test gradation voltage to the first input terminal and the second input terminal; and a chopping signal latch to latch the logic level of a test driving voltage output from the output terminal when the test switch is on, wherein the buffer amplifier performs a first type operation or a second type operation in response to the logic level of a chopping signal output from the chopping signal latch in a buffering operation, and wherein the test switch, the second type first switch, and the second type second switch are off, the first type first switch and the first type second switch are on, the gradation voltage is input to the first input terminal, and a driving voltage corresponding to the gradation voltage is output from the output terminal when the buffer performs the first type operation, wherein the first type first switch, the first type second switch, the second type first switch, and the second type second switch are off, the test switch is on, and the chopping signal latch latches the logic level of the test driving voltage in a test operation.

9. The buffer amplifier of claim 8, wherein the first type first switch and the first type second switch are on in response to a high-level chopping signal and the high-level chopping signal is input to the chopping terminal when the buffer amplifier performs the first type operation.

10. The buffer amplifier of claim 8, wherein the test switch, the first type first switch and the first type second switch are off, the second type first switch and the second type second switch are on, the gradation voltage is input to the second input terminal, and a driving voltage corresponding to the gradation voltage is output from the output terminal when the buffer amplifier performs the second type operation.

11. The buffer amplifier of claim 10, wherein the second type first switch and the second type second switch are on in response to a low-level chopping signal and the low-level chopping signal is input to the chopping terminal when the buffer amplifier performs the second type operation.

12. A method of generating a plurality of driving voltages respectively corresponding to a plurality of gradation voltages using a plurality of buffers and a plurality of chopping signal latches, the method comprising:

inputting a test gradation voltage to first input terminals and second input terminals of the buffers and latching the logic levels of test driving voltages respectively output from output terminals of the buffers on the chopping signal latches, each buffer further including a first type first switch to transfer the gradation voltage to the first input terminal, a first type second switch to connect the second input terminal to the output terminal, a second type first switch to transfer the gradation voltage to the second input terminal, a second type second switch to connect the first input terminal to the output terminal, and a test switch to transfer the test gradation voltage to the first input terminal and the second input terminal;

setting buffers outputting a high-level test driving voltage from among the plurality of buffers to a first type and setting buffers outputting a low-level test driving voltage from among the plurality of buffers to a second type; and respectively inputting the plurality of gradation voltages to the buffers set to the first type or the second type to generate the plurality of driving voltages, wherein setting the buffer to a first type comprises setting the corresponding test switch, second type first switch, and second type second switch to off, setting the corresponding first type first switch and first type second switch to on, inputting the corresponding gradation voltage to the first input terminal, and outputting the driving voltage corresponding to the gradation voltage from the output terminal, wherein the first type first switch, the first type second switch, the second type first switch, and the second type second switch are off, the test switch is on, and the chopping signal latch latches the logic level of the test driving voltage in a test operation.

13. The method of claim 12, wherein the plurality of driving voltages have a positive deviation from the plurality of gradation voltages.

14. The method of claim 12, wherein the plurality of driving voltages have a negative deviation from the plurality of gradation voltages.

15. The method of claim 12, wherein, in the buffers set to the first type from among the plurality of buffers, high-level chopping signals respectively output from the chopping signal latches respectively corresponding to the buffers are respectively input to the chopping terminals of the buffers, the output terminals of the buffers are connected to the second input terminals of the buffers, corresponding gradation voltages are respectively input to the first input terminals of the buffers, and corresponding driving voltages are respectively output from the output terminals of the buffers.

16. The method of claim 12, wherein, in the buffers set to the second type from among the plurality of buffers, low-level chopping signals respectively output from the chopping signal latches respectively corresponding to the buffers are respectively input to the chopping terminals of the buffers, the output terminals of the buffers are connected to the first input terminals of the buffers, corresponding gradation voltages are respectively input to the second input terminals of the buffers, and corresponding driving voltages are respectively output from the output terminals of the buffers.

17. The method of claim 12, wherein the plurality of buffers and the plurality of chopping signal latches are included in a display driver, and the display driver receives the plurality of gradation voltages, generates the plurality of driving voltages and outputs the plurality of driving voltages to a display panel.

18. The method of claim 17, wherein the display driver includes N buffers and N chopping signal latches when the display panel includes N data lines, wherein N is an integer.

19. A driving device usable with a display panel, the driving device comprising:

a plurality of buffers to receive input voltages and to output driving voltages, respectively, each of the buffers having a positive or negative deviation corresponding to a difference between the respective input voltage and the driving voltage, each buffer further including a first input terminal, a second input terminal, a chopping terminal, an output terminal, a first type first switch to transfer a gradation voltage to the first input terminal, a first type second switch to connect the second input terminal to the output terminal, a second type first switch to transfer the gradation voltage to the second input terminal, a second type second switch to connect the first input terminal to the output terminal, a test switch to transfer a test gradation voltage to the first input terminal and the second input terminal, and a chopping signal latch to latch the logic level of a test driving voltage output from the output terminal when the test switch is on; and a plurality of latches to set operation type of each of the buffers such that all of the buffers have positive deviation or all of the buffers have negative deviation to reduce a dispersion range of the deviations, wherein each buffer is set to a first type or a second type in response to the logic level of a chopping signal output from the chopping signal latch in a buffering operation, and wherein when one of the plurality of buffers is set to the first type, the corresponding test switch, second type first switch, and second type second switch are off, the corresponding first type first switch and first type second switch are on, the corresponding gradation voltage is input to the first input terminal, and the driving voltage corresponding to the gradation voltage is output form the output terminal, wherein the first type first switch, the first type second switch, the second type first switch, and the second type second switch are off, the test switch is on, and the chopping signal latch latches the logic level of the test driving voltage in a test operation.

20. A method of generating a plurality of driving voltages from a plurality of input voltages by using a plurality of buffers, the method comprising:

determining whether each of the buffers has a positive deviation or a negative deviation according to the logic level of a chopping signal output from a chopping signal latch of the buffer in a buffering operation, the chopping signal latch being configured to latch the logic level of a test driving voltage output from an output terminal of the buffer when a test gradation voltage is transferred to a first input terminal and a second output terminal of the buffer;

setting buffers having a positive deviation to a first type and setting buffers having a negative deviation to a second type; and generating the plurality of driving voltages from the plurality of input voltages by using the plurality of buffers set to the first type or the second type:

wherein all of the driving voltages respectively have positive deviation from corresponding input voltage, or all of the driving voltages respectively have negative deviation from corresponding input voltage, wherein each of the plurality of buffers further includes a chopping terminal, a first type first switch to transfer a gradation voltage to the first input terminal, a first type second switch to connect the second input terminal to the output terminal, a second type first switch to transfer the gradation voltage to the second input terminal, a second type second switch to connect the first input terminal to the output terminal, and a test switch to transfer a test gradation voltage to the first input terminal and the second input terminal, wherein setting one of the buffers to the first type comprises setting the corresponding test switch, second type first switch, and second type second switch to off, setting the corresponding first type first switch and first type second switch to on, inputting the corresponding gradation voltage to the first input terminal, and outputting the driving voltage corresponding to the gradation voltage from the output terminal, wherein the first type first switch, the first type second switch, the second type first switch, and the second type second switch are off, the test switch is on, and the chopping signal latch latches the logic level of the test driving voltage in a test operation.

21. A non-transitory computer-readable recording medium having embodied thereon a computer program to execute a method of generating a plurality of driving voltages from a plurality of input voltages by using a plurality of buffers, wherein the method comprises:

determining whether each of the buffers has a positive deviation or a negative deviation according to the logic level of a chopping signal output from, chopping signal latch of the buffer in a buffering operation, the chopping signal latch being configured to latch the logic level of a test driving voltage output from an output terminal of the buffer when a test gradation voltage is transferred to a first input terminal and a second input terminal of the buffer;

setting buffers having a positive deviation to a first type and setting buffers having a negative deviation to a second type; and generating the plurality of driving voltages from the plurality of input voltages by using the plurality of buffers set to the first type or the second type;

wherein all of the driving voltages respectively have positive deviation from corresponding input voltage, or all of the driving voltages respectively have negative deviation from corresponding input voltage, wherein each of the plurality of buffers further includes a chopping terminal, a first type first switch to transfer a gradation voltage to the first input terminal, a first type second switch to connect the second input terminal to the output terminal, a second type first switch to transfer the gradation voltage to the second input terminal, a second type second switch to connect the first input terminal to the output terminal, and a test switch to transfer a test gradation voltage to the first input terminal and the second input terminal, and wherein setting one of the buffers to the first type comprises setting the test switch, the second type first switch, and the second type second switch to off, setting the first type first switch and the first type second switch to on, inputting the gradation voltage to the first input terminal and outputting the driving voltage corresponding to the gradation voltage from the output terminal, wherein the first type first switch, the first type second switch, the second type first switch, and the second type second switch are off, the test switch is on, and the chopping signal latch latches the logic level of the test driving voltage in a test operation.

* * * * *